UNITED STATES PATENT OFFICE.

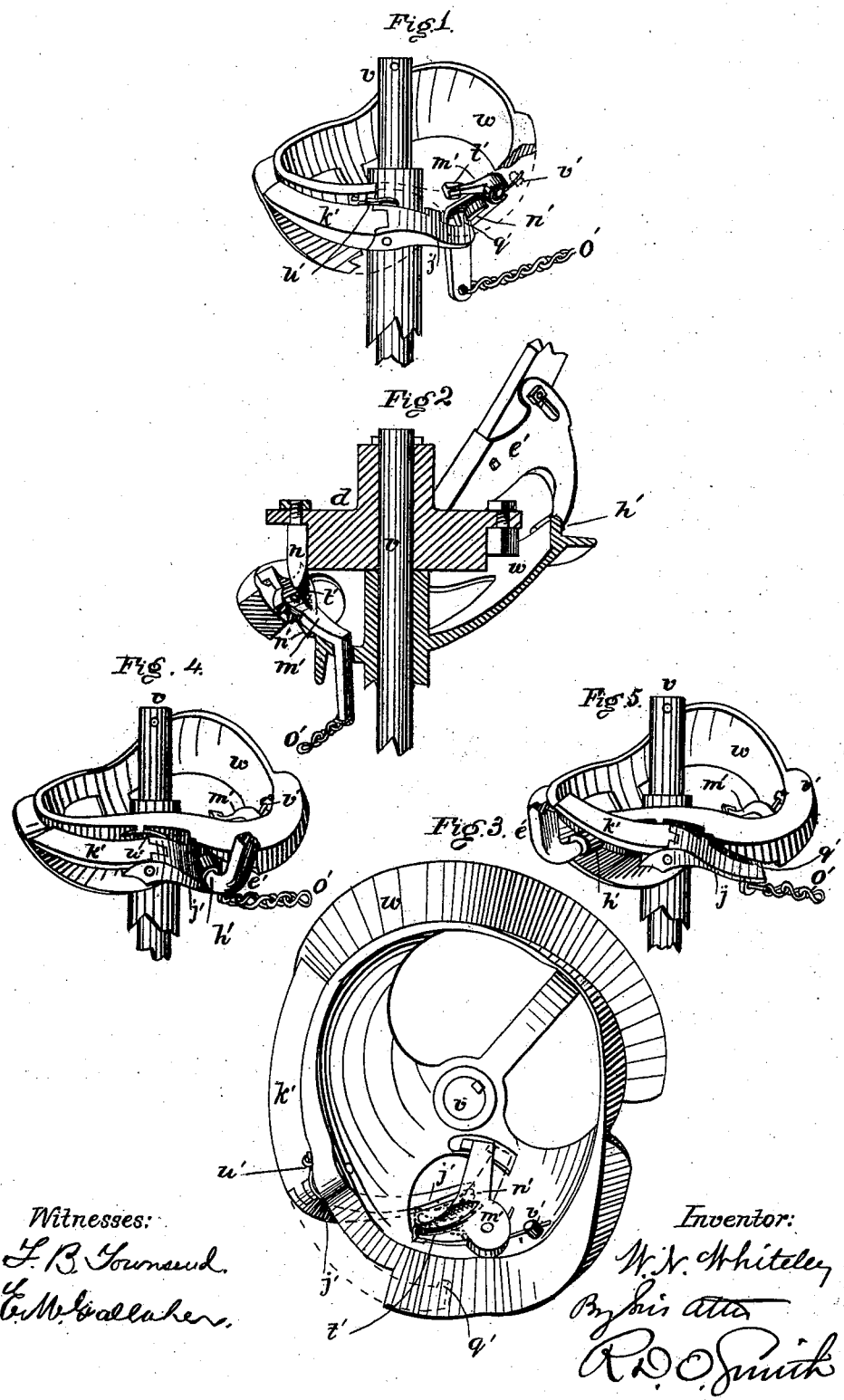

WILLIAM N. WHITELEY, OF SPRINGFIELD, OHIO.

IMPROVEMENT IN HARVESTER-RAKES.

Specification forming part of Letters Patent No. 172,810, dated January 25, 1876; application filed November 10, 1875.

*To all whom it may concern:*

Be it known that I, WILLIAM N. WHITELEY, of Springfield, Clarke county, in the State of Ohio, have invented a new and useful Improvement in Harvester-Rakes, of which the following is a full, clear, and exact description, reference being had to the accompanying drawings, wherein—

Figure 1 is a perspective view of my invention, the parts being in operative positions. Fig. 2 is a central section of the same. Fig. 3 is a plan of the same. Figs. 4 and 5 are perspectives, representing the action of the switch and friction-roller.

My invention relates to the latch which holds the switch open, whereby the path of the rake is changed from the lower to the upper camway and the removal of the cut grain is prevented; and it consists in the construction of said switch, substantially in the form and manner hereinafter fully shown and described.

That others may fully understand my invention, I will first describe briefly the construction of the cam and switch and the operation of the latter.

The cam or guide way $w$ is cast in one piece, and is adjusted to secure the proper stroke of the rake and reel beaters as they descend into the standing grain in front of the cutters.

At the top of the revolving shaft $v$ there is mounted the head $d$, to which the rake and reel arm heads $e$, are pivoted by joint-bolts.

The rake-arm heads $e'$ are provided with friction-rollers $h'$, which traverse the cam $w$, and guide the rake and reel beaters in their proper course.

The cam $w$ is provided with two tracks on the side toward the platform, and a switch, $j'$, to turn the roller $h'$ from the lower to the higher of said tracks, when it is not desirable that the gavel should be removed.

The beater then passes above the cut grain on the platform.

When said switch is open, the roller $h'$ passes under it and along the lower trackway, and the beater then becomes a rake and removes the gavel.

A movable bridge-piece, $k'$, is employed to carry the rake-arm roller $h'$ from the switch $j'$ to the single portion of the camway $w$ behind the platform.

When the roller $h'$ traverses the camway below the switch $j'$, an inclined portion of the camway $w$ causes the said roller to pass under the bridge $k'$, which rises up to permit said roller to pass, and said bridge being mounted with a hinge-joint upon the same stud with the switch $j'$, the latter is forced to close as the bridge rises, and it is caught and held in that position by a bell-crank latch, $m'$, which is pivoted to the inner surface of the camway, and may be tripped automatically by a pin, $n$, set in the revolving head $d$, or it may be tripped at will by the driver, by means of the latch chain or cord $o'$, which extends forward to a foot-crank conveniently located on the front of the main frame, or on the driver's foot-board.

The latch $m'$ is angular or bell-crank shaped, and is secured to the inner surface of the cam $w$ by a pivot-pin, which passes through said latch at the angle or junction of its two arms.

The longer arm extends down through the web of the cam-guide, and to its extremity the latch chain or cord $o'$ is attached.

On the under side of this same arm there is a detent-rib, $n'$, which engages with a toe, $q'$, on the end of the switch $j'$, and holds the said switch down, as shown in Fig. 1.

The other branch of the latch $m'$ extends forward horizontally from its pivot-pin, and is provided on its upper or outer side with a groove, $t'$, along which the pin $n$ traverses at each revolution of the head $d$, and when so traversed this end of the latch is thereby depressed, and the detent-rib $n'$ is caused to move backward and swing away from the toe $q'$, and the switch is liberated and immediately raised by its spring $u'$.

When the switch is again depressed, the toe $q'$ engages with the side of the rib $n'$, and the latch-lever yields to let said toe pass below the rib and be detained by it.

The central part of the latch $m'$ is chambered around the pivot-pin, as shown in Fig. 1, and a notch is cut in the side of said chamber. A spring-wire is placed within said chamber, around the pivot-pin. The two ends of said spring project through said notch, one end bearing against said notch, and the other end bearing against a small stud, $v'$. Said spring thereby serves as a retracting-spring for the latch $m'$, to keep it always in operative condition.

Having described my invention, what I claim as new is—

The bell-crank latch $m'$, constructed as described, and provided with the detent-rib $n'$ on its under side, and the groove $t'$ on its upper side, combined with the switch $j'$, trip-pin $n$, and cord or chain $o'$.

WILLIAM N. WHITELEY.

Witnesses:
R. D. O. SMITH,
F. B. TOWNSEND.